United States Patent [19] [11] 3,778,669
Cooper et al. [45] Dec. 11, 1973

[54] MAGNETIC DEFLECTION SYSTEM FOR DEPRESSED-CENTER SECTOR SCAN DISPLAY

[75] Inventors: George P. Cooper, Corona Del Mar; Thomas H. Moore, Santa Ana, both of Calif.

[73] Assignee: North American Rockwell Corporation, El Segundo, Calif.

[22] Filed: Mar. 13, 1972

[21] Appl. No.: 234,015

[52] U.S. Cl. .................................. 315/23, 343/5 R
[51] Int. Cl. ........................................... H01j 29/70
[58] Field of Search ............................... 178/7.5 SE; 335/210–213; 315/27 XY, 27 TD, 23, DIG. 35; 343/11 R, 5 R

[56] References Cited
UNITED STATES PATENTS
3,020,541  2/1962  Dickey ............................. 343/11 R
3,309,702  3/1967  Saxton ............................. 343/11 R Primary Examiner—Maynard R. Wilbur
Assistant Examiner—J. M. Potenza
Attorney—L. Lee Humphries et al.

[57] ABSTRACT

An electromagnetic deflection system to provide a low-cost, depressed-center CRT display for a sector scanning sensor. An auxiliary coil (usually a ring) is wound about a cathode ray tube, axially spaced intermediate the conventional deflection yoke and the display face of the CRT, and oriented relative to the longitudinal axis of the tube to provide a resultant magnetic vector which is mutually angled relative to such longitudinal axis. The deflection system can be driven by conventional low cost flyback deflection circuits producing sawtooth deflection currents. For example, in a display for an azimuthally scanning radar, the radar range sweep generator frequency output need be applied only to the vertical deflection winding of the conventional deflection yoke, while the radar azimuth scan frequency is applied either to the auxiliary coil alone or to the auxiliary coil and the horizontal deflection winding of the conventional deflection yoke in series.

15 Claims, 17 Drawing Figures

MAGNETIC DEFLECTION SYSTEM FOR DEPRESSED-CENTER SECTOR SCAN DISPLAY

BACKGROUND OF THE INVENTION

The field of technology to which the subject invention relates is the deflection of cathode ray tubes.

In the prior art of cathode ray tube display devices, an electron beam is propagated generally longitudinally through the tube to strike a suitably phosphor-coated transparent face of the tube and cause the emission of visible light. Deflection control of the electron beam in conjunction with intensity modulation thereof, allows the sequential generation of a display pattern, as is well understood in the art.

The conventional electromagnetically controlled cathode ray tube employs a deflection yoke comprising two pairs of windings or deflection coils, to produce mutually crossed transverse magnetic fields, relative to the longitudinal axis of the tube and traversed by the electron beam. As is well understood, a magnetic field vector at right angles to the electron beam vector results in deflection of the electron beam in a direction at right angles to both the magnetic field vector and the longitudinal axis. Thus, in a cathode ray tube oriented with the longitudinal axis and one pair of the yoke windings substantially horizontal, excitation of the horizontal windings will produce vertical deflection of the electron beam, and excitation of the vertical windings will produce horizontal deflection of the beam.

The conventional deflection control technique used to generate a sector scan display (partial azimuth sector versus range) for a radar system employing an electromagnetically controlled cathode ray tube, is to use both the vertical and horizontal deflection control windings of a conventional deflection yoke. In such an arrangement, the vertical deflection winding employs a range sweep current that is proportional to the desired range sweep, multiplied by the cosine of the deflection angle (or system azimuth look angle), while the horizontal deflection winding employs the range sweep current modulated by the sine of the deflection angle. In a conventional mechanical scanning radar system, this is usually accomplished by feeding the radar range sweep signal through a resolver which is driven by the antenna mechanical scan drive and in synchronism therewith. The two outputs of the resolver are then amplified by two linear, wide band Class A power amplifiers for driving the two sets of deflection windings of the cathode ray tube deflection yoke, which amplifiers are somewhat expensive, relative to flyback type deflection amplifiers used in conventional TV applications.

Such form of display scan generation is not very efficient, since both deflection amplifiers and both yoke windings must carry the high frequency (range) sweep and recovery currents. Also, in a radar system employing an electronically scanning antenna, no antenna mechanical scan drive is available for synchronously driving the electromechanical resolver, thereby requiring expensive electronic computing circuits for effecting such function. Further, in a forward-looking mapping radar for airborne use, the generation of a depressed sector scan display (the scan center of which is depressed relative to the center of the display face of the cathode ray tube to utilize a larger portion of the display face) requires a dc biasing current in the vertical deflection control.

SUMMARY OF THE INVENTION

By means of the concept of the present invention the above-noted shortcomings of the prior art are avoided and there is provided low-cost and efficient means for generating a sector scan having a depressed-center.

In a preferred embodiment of the subject invention there is provided a cathode ray tube for exemplary use as a plan position display indicator in a radar system and having a conventional deflection yoke. There is also provided an auxiliary coil wound about the cathode ray tube and axially spaced intermediate the deflection yoke and display face of the cathode ray tube, and is further oriented relative to the longitudinal axis of the tube to provide a resultant magnetic vector which is mutually angled relative to such longitudinal axis.

In such application, a sawtooth current synchronized with the radar range (fast) sweep generator output is applied only to the vertical deflection winding of the deflection yoke, while a sawtooth current synchronized with the radar azimuth scan signal is applied to the auxiliary coil. The auxiliary coil is positioned so that it produces a magnetic vector through the apex of the depressed-center, sector scan raster. At the beginning of each range sweep, the vertical deflection field from the conventional deflection yoke directs the electron beam parallel to the magnetic vector of the auxiliary coil. Thus at this point in the raster, the auxiliary coil produces zero deflection. As the range sweep progresses to larger ranges and because of the increasing angle between the electron beam emerging from the deflection yoke and the magnetic vector of the auxiliary coil, the auxiliary coil produces an increasing deflection to either the right or left, depending on the polarity of the field from the auxiliary coil.

Thus a depressed ±45° sector scan, for example, may be generated using low cost flyback type deflection control circuits. Also, less sweep frequency power is required to effect such display, resulting in power supply economies. Accordingly, it is an object of the invention to provide an improved radar sector scan generator system.

It is another object of the invention to provide a radar display device providing a depressed center sector scan.

A further object is to provide a depressed-center sector scan display system which is relatively inexpensive to manufacture.

These and other objects of the invention will become apparent from the following description taken together with the accompanying drawings in which:

BRIEF DESCRIPTION OF THE DRAWINGS

In the figures, like characters refer to like parts.

DESCRIPTION OF THE PREFERRED EMBODIMENTS

Figure 1A:
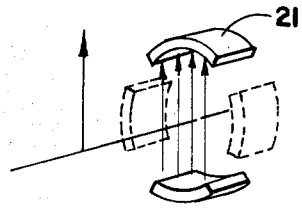
FIGS. 1a, 1b, 1c and 1d are diagrammatic representations of a conventional CRT yoke and the geometry of the deflection response of an electron beam thereof to a component magnetic field vector normal to the direction of propagation of the electron beam.
Figure 1C:
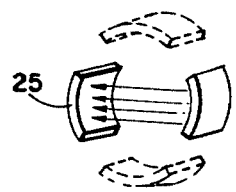
Figure 1B:
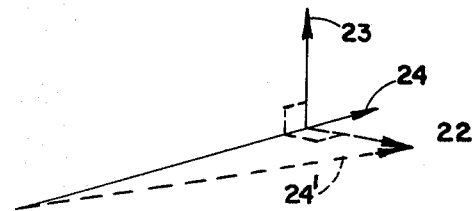
Figure 1D:
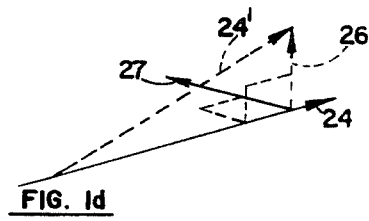

Referring now to FIGS. 1a, 1b, 1c and 1d, there is illustrated in FIG. 1a a representation of the horizontal deflection coils 21 of a conventional cathode ray tube deflection yoke, while FIG. 1b illustrates the geometry of the horizontal (lateral) deflection response 22 of an electron beam thereof to a (vertical) component magnetic field vector 23 (produced by excitation of coils 21 and) normal to the (horizontal) direction of propagation of the electron beam 24. FIG. 1c represents the vertical deflection control coils 25 of the control yoke, while FIG. 1d illustrates the geometry of the vertical deflection response 26 to a (horizontal) component magnetic field vector 27 (produced by excitation of coils 25 and) normal to the direction of propagation of the electron beam 24. From a review of such figures, it is to be appreciated that a magnetic vector occurring normal to the direction of propagation of an electron beam results in deflection of the beam in a direction normal to both the beam direction and the magnetic field vector.

Figure 2A:
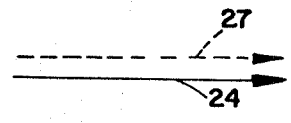
FIGS. 2a and 2b are vector diagrams of a set of an electron beam vector and a magnetic field vector in a preselected mutually angled relationship.
Figure 2B:
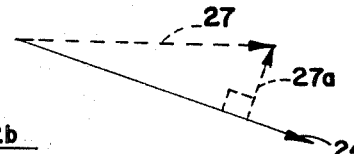

The application of such principle may be applied to the arrangement of (dotted line) magnetic field and (solid line) electronic beam vectors in FIGS. 2a and 2b. Referring to FIG. 2a, where the magnetic field vector 27 is substantially parallel to the direction of the electron beam 24, no deflection of the beam occurs. Referring to FIG. 2b, where the magnetic field vector 27 is mutually angled (in the plane of the figure) relative to the electron beam vector 24, as to be resolvable into a component field vector 27a normal to beam vector 24, then deflection of the beam in a direction out of (normal to) the drawing occurs. Such principle is employed in the device illustrated in FIG. 3.

Figure 3A:
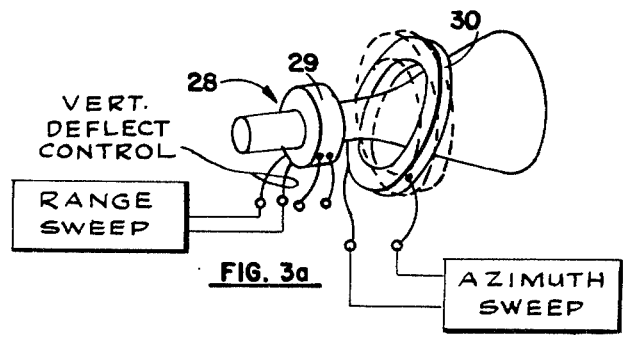
FIGS. 3 and 3a are representations of a cathode ray tube embodying an aspect of the invention and illustrating the use and arrangement of an auxiliary coil in cooperation with the cathode ray tube.
Figure 3:
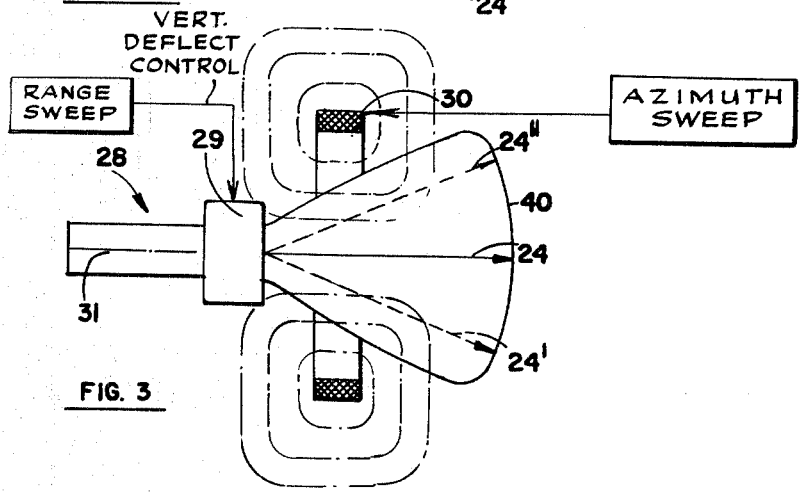
Figure 4:
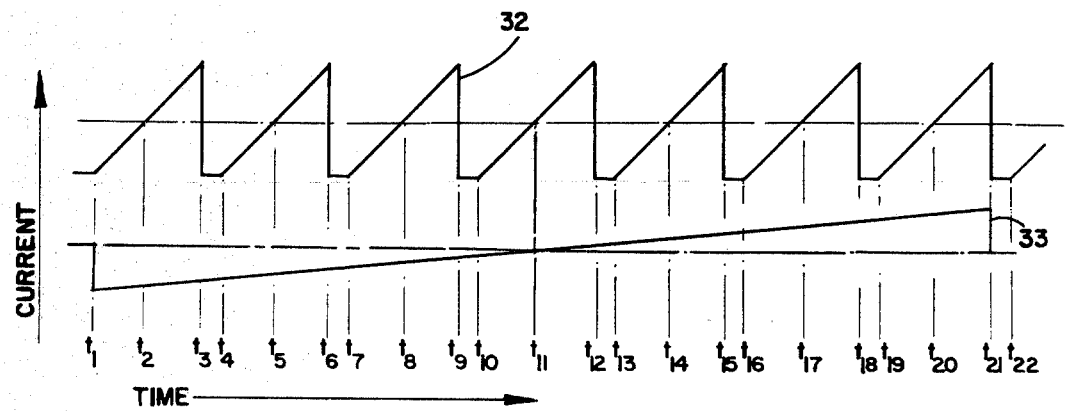
FIG. 4 is a family of time histories of representative excitations applied to the device of FIG. 3 in a radar sector scan application.
Figure 5:
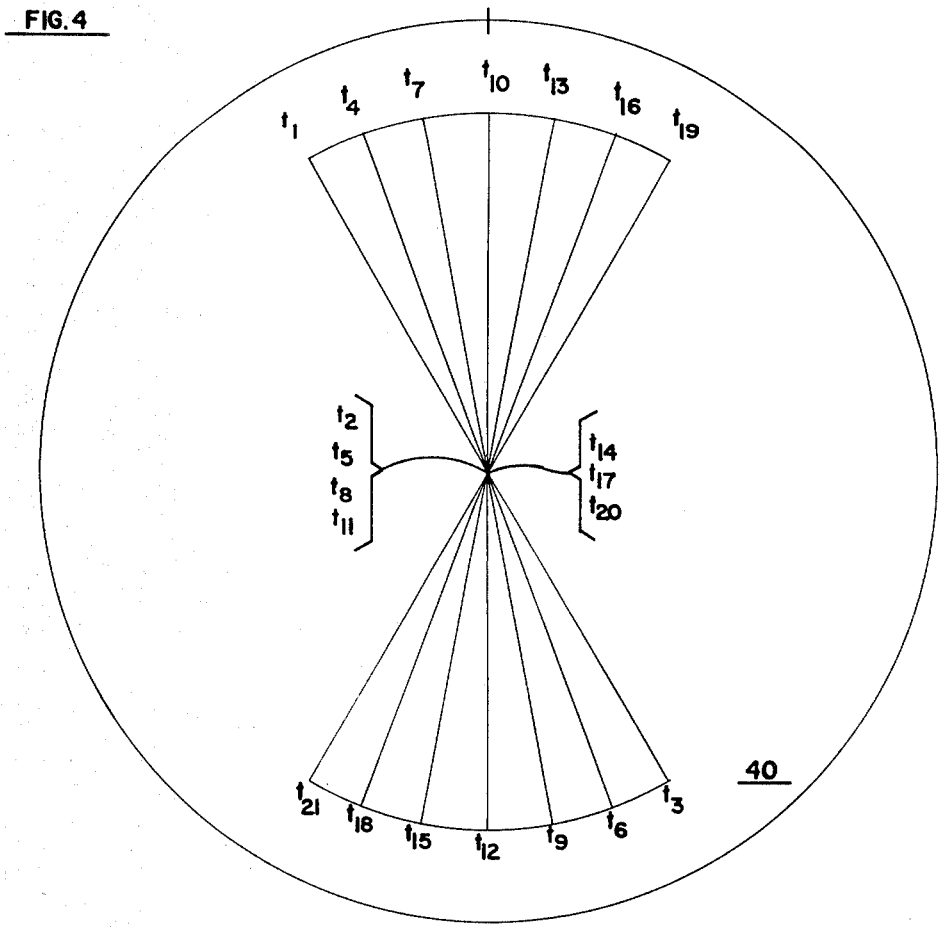
FIG. 5 is a diagram of a representative display provided by the device of FIG. 3 in response to the excitations of FIG. 4.
Figure 6:
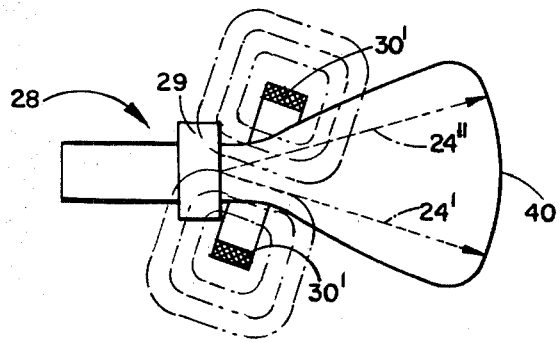
FIG. 6 is an illustration of an alternate embodiment of the device of FIG. 3 and depicting a uniform auxiliary magnetic field in the vicinity of and mutually angled relative to the longitudinal axis of the cathode ray tube of FIG. 3.
Figure 8:
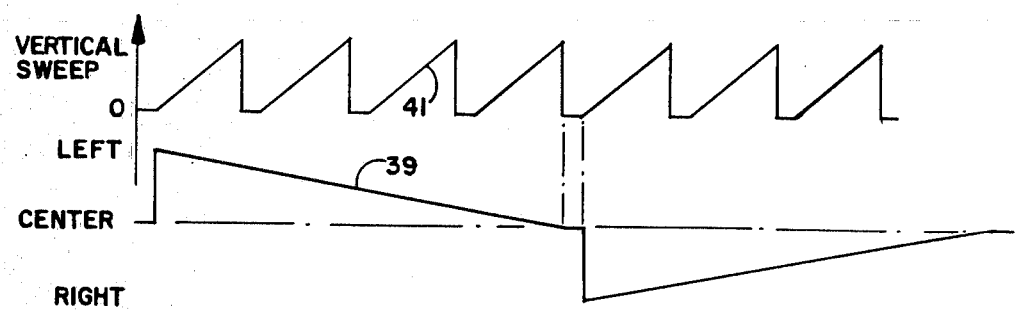
FIG. 8 is a family of time histories of a representative set of excitations applied to the device of FIG. 5 to provide the depressed center sector scan display of FIG. 7.
Figure 7:
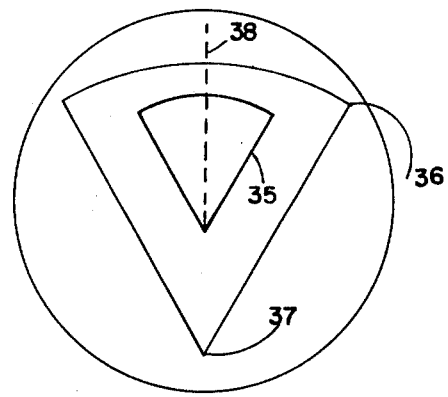
FIG. 7 is an illustration of a representative centered sector scan (in dotted line) and of an ideal depressed center sector scan provided by the device of FIG. 6 (showing increased utilization of the cathode ray tube display face)

Referring to FIG. 3, there is illustrated a cathode ray tube 28 embodying an aspect of the invention. In addition to deflection yoke 29 (the horizontally disposed coils of which are employed to effect vertical sweeping of electron beam 24), there is provided an auxiliary coil 30 wound about cathode ray tube 28 and axially spaced intermediate yoke 29 and a display face 40 of tube 28. As illustrated, such coil 30 is arranged to provide a substantially uniform magnetic vector field 31 about and substantially parallel to longitudinal axis 31 of tube 28. Accordingly, as the beam is vertically swept from a central (horizontal) position (on face 40) above or below thereof, a vertical angle is developed between the vector direction of the uniform magnetic field and the electron beam and which will tend to deflect the beam in a direction normal to both the magnetic vector and the beam (in or out of the figure, as described in connection with the situation depicted in FIG. 2b). As the off-axis sweep position relative to the longitudinal axis 31 increases, the vertical angle between the electron beam and the magnetic vector increases, thereby increasing the component magnitude of the magnetic vector resolved normal to the electron beam direction.

Where an alternating (polarity-reversing) range sweep current is applied to the vertical deflection control input of yoke 29 to progressively sweep the electron beam from a lower deflection 24' on the face 30 of tube 28 to an upper deflection 24", corresponding to the range sweep signal wave form 32 in FIG. 4, the sense of the component magnetic field vector, resolved normal to the electronic beam, changes sense as the magnitude of such component goes through zero, as to reverse the sense of the beam deflection induced thereby. Where an excitation waveform 33 (in FIG. 4) is applied to the auxiliary coil 30 and having a modulation frequency corresponding to the antenna scan rate of a utilizing radar system and to waveform 33 of FIG. 4, a butterfly-type Lissajou envelope is displayed on face 40 of CRT 28, as illustrated in FIG. 5.

Where the vertical deflection sweep signal is unipolar (and of limited excursion), then only one or the other of the two (upper and lower) cusps is ideally displayed in FIG. 5, and a conventional centered sector scan in provided (corresponding to outline 35 in FIG. 7) by means of the device of FIG. 3. Also, the necessity of modulating the vertical sweep input as a function of the cosine of the scan angle (signal) is avoided. Moreover the necessity of applying the sweep frequency signal, modulated by the sine of the scan angle (signal), to the horizontal deflection control of yoke 29 is also avoided. In order to make fuller use of face 40 of CRT 28 to provide a larger scale sector scan, corresponding to outline 36 of FIG. 7, a depressed center 37 is required. Such depressed center of sector scan 36 may be achieved by means of the invention by downwardly orienting the forward direction of the magnetic field vector as shown in FIG. 6. A maximum angle for such orientation is the angle of the conical envelope itself of tube 28 relative to axis 31. The calibrated vertical deflection of electron beam 24 to an orientation substantially parallel with the substantial uniform field vector of FIG. 6 corresponds to depressed center 37 of the depressed-center sector scan display 36 of FIG. 7. Thus, deflection upwards of beam 24 in response to a (range) sweep input to the vertical deflection control of yoke 29, will ideally result in a unipolar sense of the component magnetic field vector (resolved normal to the electron beam direction for a unipolar magnetic field. Hence, scalar scanning of the magnetic field (modulated excitation of coil 30) produces limited angular scanning-off to one side of the center 38 of outline 36. By the use of an alternating (bipolar) scanning wave from excitation, applied to coil 30 of FIG. 6 and corresponding to curve 39 of FIG. 8, in conjunction with the (range) sweep waveform applied to yoke 29 and corresponding to curve 41 in FIG. 8, the depressed-center sector scan of FIG. 7 is achieved, the scan progressing alternately from left and right to center.

Figure 9:
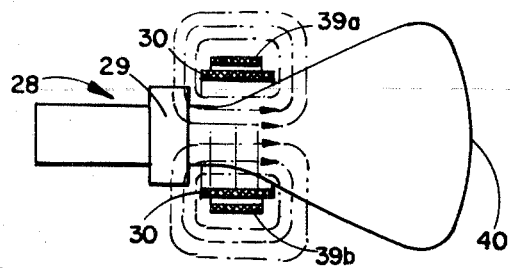
FIG. 9 is an alternate embodiment of the device of FIG. 6 for providing a depressed-center sector scan.

The depressed orientation of the field vector in FIG. 6 is achieved by orienting coil 30 so that the desired field vector is obtained, as shown. Alternatively, two symmetrical windings may be utilized, mutually concentric with each other and with tube 28, one winding 30 providing a field vector substantially parallel to tube axis 31, the other winding 39a and 39b arranged to provide a field vector substantially transverse of axis 31 in a vertical direction as shown more particularly in FIG. 9. Thus, the combined field vector is inclined vertically relative to axis 31.

Yet a simpler and more effective means for achieving a depressed-center sector scan is to incline coil 30 (in the symmetrical arrangement of FfG. 3) from a vertical position, as shown more particularly in FIG. 3a.

Figure 10:
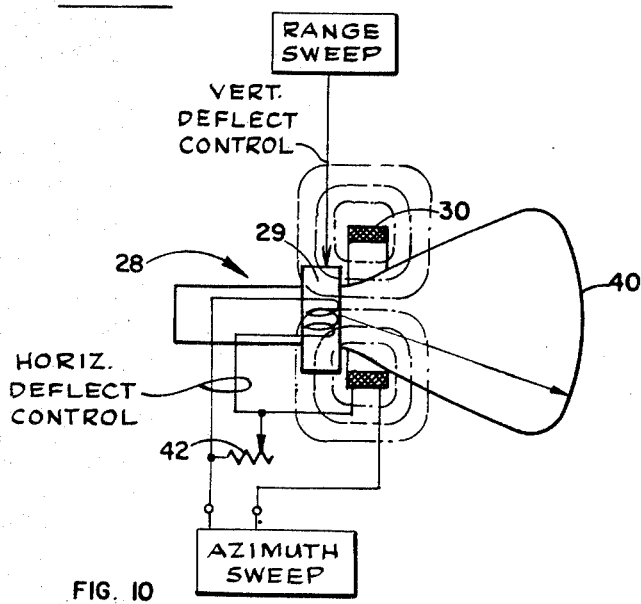
FIG. 10 is a preferred alternative embodiment for providing a depressed-center sector scan.

Still a further arrangement for achieving a depressed center sector scan (or inclined magnetic field vector) is the preferred embodiment of FIG. 10, in which the center of coil 30 is displaced vertically (radially) of tube axis 31.

Figure 11A:
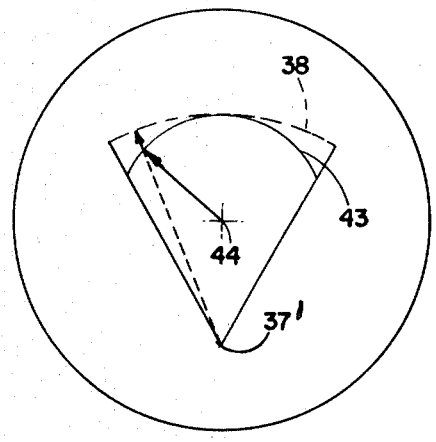
FIGS. 11a and 11b are illustrations of several forms of aberrations occurring in the imperfect generation of the idealized depressed-center sector scan of FIG. 7.

The center of that deflection produced by the auxiliary coil 30 (of the electron beam) is a point on the longitudinal axis of the electron gun. Thus, in the generation of a plan position indicator (PPI) display, the envelope of the top of the PPI fan is a circular arc, the center of which lies on such longitudinal axis. Accordingly, for a conventional CRT, having an electron gun aimed at the center of the CRT face and utilized to produce the depressed-center sector scan by means of the auxiliary coil of the invention, the "ice cream cone" effect of arc 43 in FIG. 11a results, rather than an arc 38 whose center is the depressed center 37 of the depressed center sector scan. Such effect is not appreciably noticeable for sector scans up to ±22.5°. Above ±22.5°, such "ice cream cone" effect may be compensated for (up to ±45°) by connecting the horizontal deflection control (vertically polarized) coils of yoke 29 (in FIG. 10) in series with auxiliary coil 30, to approach the curvature 38 of FIG. 11a.

Figure 11B:
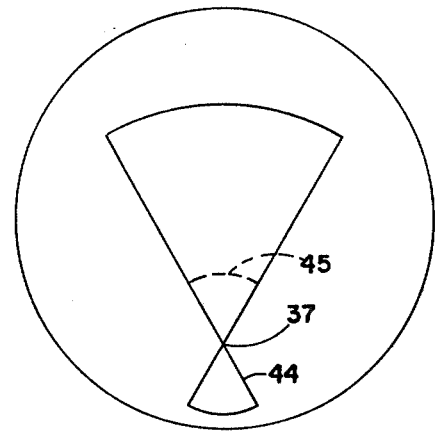

If the relative magnitudes of the deflection control provided by the auxiliary coil and the associated series connected vertical deflection control (of yoke 29) are not suitably adjusted, then either the "butterfly" effect illustrated by curve 44 in FIG. 11b or the truncated cone effect illustrated by the dotted truncating arc 45 in FIG. 11b may result.

The proportion of the auxiliary coil excitation applied to the series-connected vertical deflection control (of yoke 29) may be adjusted by a shunting potentiometer 42 connected across such deflection control. Additional compensation for the "butterfly" effect may also be provided by orienting such portion of the display to occur below (off) the display face 40 of tube 28 (e.g., by orientation of the auxiliary coil). Accordingly, it is to be understood that the operation of series connected auxiliary coil 30 and the horizontal deflection control of yoke 29 are employed to complement each other in FIG. 10 in achieving the display 36 of FIG. 7. Although shunting potentiometer 42 has been described as connected across the deflection control winding, such potentiometer may be connected across auxiliary coil 30, where required to effect such compensation for a specific design. By means of such combination of compensation techniques, the device of FIG. 10 may be made to more nearly provide the idealized depressed-center scan 37 of FIG. 7.

Accordingly, there has been illustrated simple and effective means for efficiently utilizing conventional low cost flyback circuits to produce a sector scan, while at the same time avoiding the necessity of prior art sine and cosine scan angle modulation of the (range) sweep. Although the utility of the invention has been described in terms of a radar system display, it is not so limited and may be utilized in other display system applications.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a display system employing an azimuthal scan generator, a range sweep generator and a cathode ray tube having a longitudinal axis and a deflection control yoke, means for providing a plan position indicator sector scan having a center radially offset from the display face center of said tube and comprising an auxiliary coil externally of said indicator and axially spaced intermediate said control yoke and said display face and oriented relative to the longitudinal axis of said tube to provide a resultant magnetic vector which is mutually angled relative to said longitudinal axis, said auxiliary coil being driven by said azimuthal scan generator, and only a preselected one of the two mutually orthogonal deflection controls of said control yoke being driven by said range sweep generator.

2. The device of claim 1 in which there is further included a pair of windings interconnected in series magnetic-aiding circuit with and disposed mutually concentric with and coaxial of said auxiliary coil, the component magnetic vector provided by excitation of said pair being radial of said longitudinal axis.

3. The device of claim 1 in which said auxiliary coil is oriented to provide a resultant magnetic vector mutually angled relative to said longitudinal axis in a plane parallel to the electron beam deflection direction provided by excitation of only a preselected one of the two control inputs of said deflection yoke, a second control input of said yoke being connected in circuit with said auxiliary coil.

4. In an azimuthally scanning radar system, a depressed center sector scan display device, comprising
 a cathode ray tube having a deflection control yoke for providing deflection control of an electron beam in a first and second mutually orthogonal direction, only a first input of said control yoke being responsive to a range sweep generator of said radar system for effecting deflection control in said first direction; and
 an auxiliary coil wound about said tube and axially spaced intermediate said control yoke and a display face of said tube and responsive to an azimuthal scan signal generator of said radar system and oriented to provide a magnetic vector mutually angled relative to a longitudinal axis of said tube in a plane substantially parallel to said first deflection control direction.

5. A depressed center sector scan display device for use in an azimuthally scanning radar system and comprising a cathode ray tube having a deflection control yoke for providing deflection control of an electron beam in a first and second mutually orthogonal direction, a first input of said control yoke being adapted to be responsive to a range sweep generator of said radar system for effecting deflection control in said first direction; and an auxiliary coil wound about said tube and axially spaced intermediate said control yoke and a display face of said tube and adapted to be responsive to an azimuthal scan signal generator of said radar system and oriented to provide a magnetic vector mutually angled relative to a longitudinal axis of said tube in a plane substantially parallel to said first deflection control direction, said auxiliary coil being connected in series circuit with a second input of said deflection yoke.

6. The device of claim 4 in which there is provided means for selectively exciting a second input of said control yoke relative to and in synchronism with excitation of said auxiliary winding.

7. The device of claim 4 in which there is included an auxiliary yoke mutually concentric with and coaxial of said auxiliary winding and in series circuit therewith for providing a component magnetic vector substantially parallel to said first deflection control direction and perpendicular to that provided by said first input to said first mentioned control yoke.

8. The device of claim 5 in which there is provided a shunting impedance across one of said auxiliary coil and said second input of said first mentioned control yoke.

9. In a display system employing a cathode ray tube of the electromagnetic deflection control yoke type, means for providing an improved plan position indicator sector scan, comprising an auxiliary deflection coil externally wound about said tube and axially spaced intermediate a control yoke and a display face of said tube and oriented with a magnetic vector provided by said coil in the vicinity of the longitudinal axis of said tube being preselectively angled relative to said longitudinal axis, said auxiliary deflection coil being responsive to an azimuthal scan signal generator of said system and only a preselected one of the two deflection control inputs of said yoke being responsive to a radial range sweep generator.

10. The device of claim 9 in which said magnetic vector is displaced from said longitudinal axis of said indicator in one of said two deflection control directions.

11. The device of claim 9 in which said magnetic vector is preselectively angled relative to said longitudinal axis in one of said control directions.

12. The device of claim 9 in which said magnetic vector is displaced from said longitudinal axis of said display indicator in one of said two deflection control directions and in which said magnetic central axis is preselectively angled relative to said longitudinal axis of said indicator in one of said two deflection control directions.

13. The device of claim 12 in which there is provided means for coupling at least a portion of the excitation through said auxiliary deflection coil into that control winding pair of said control yoke associated with a preselected one of said control directions.

14. A depressed center sector scan display device for use in an azimuthally scanning radar system and comprising a cathode ray tube having a deflection control yoke for providing deflection control of an electron beam in a first and second mutually orthogonal direction, a first input of said control yoke being adapted to be responsive to a range sweep generator of said radar system for effecting deflection control in said first direction; and an auxiliary coil wound about said tube and axially spaced intermediate said control yoke and a display face of said tube and adapted to be responsive to an azimuthal scan signal generator of said radar system and oriented to provide a magnetic vector mutually angled relative to a longitudinal axis of said tube in a plane substantially parallel to said first deflection control direction in which there is provided means for coupling at least a portion of the excitation through said auxiliary coil into said second input of said control yoke.

15. A depressed center sector scan display device for use in an azimuthally scanning radar system and comprising a cathode ray tube having a deflection control yoke for providing deflection control of an electron beam in a first and second mutually orthogonal direction, a first input of said control yoke being adapted to be responsive to a range sweep generator of said radar system for effecting deflection control in said first direction; and an auxiliary coil wound about said tube and axially spaced intermediate said control yoke and a display face of said tube and adapted to be responsive to an azimuthal scan signal generator of said radar system and oriented to provide a magnetic vector mutually angled relative to a longitudinal axis of said tube in a plane substantially parallel to said first deflection control direction;

an auxiliary yoke mutually concentric with and coaxial of said auxiliary winding and in series circuit therewith for providing a component magnetic vector substantially parallel to said first deflection control direction and perpendicular to that provided by said first input to said first mentioned control yoke, said auxiliary yoke being comprised of two windings diametrically disposed about the longitudinal axis of said tube, the magnetic axes of said windings being substantially mutually aligned, said windings being interconnected in series aiding circuit.

* * * * *